United States Patent [19]

Clancey

[11] Patent Number: 4,502,580
[45] Date of Patent: Mar. 5, 1985

[54] FLUID COUPLING WITH HYSTERESIS REDUCING VALVE

[75] Inventor: Stephen M. Clancey, Battle Creek, Mich.

[73] Assignee: Eaton Corporation, Cleveland, Ohio

[21] Appl. No.: 360,019

[22] Filed: Mar. 19, 1982

[51] Int. Cl.³ .................... F16D 35/00; F16D 43/25
[52] U.S. Cl. ............................ 192/58 B; 192/82 T
[58] Field of Search ................. 192/58 B, 82 T

[56] References Cited

U.S. PATENT DOCUMENTS

| | | | |
|---|---|---|---|
| 3,159,254 | 12/1964 | Weir | 192/82 T |
| 3,227,254 | 1/1966 | Sutaruk | 192/58 B |
| 3,587,801 | 6/1971 | Riner | 192/58 B |
| 4,281,750 | 8/1981 | Clancey | 192/58 B |
| 4,295,550 | 10/1981 | Hayashi | 192/58 B |
| 4,298,111 | 11/1981 | Hayashi | 192/58 B |

FOREIGN PATENT DOCUMENTS

| | | | |
|---|---|---|---|
| 2234010 | 7/1972 | Fed. Rep. of Germany. | |
| 0069327 | 5/1980 | Japan | 192/58 B |
| 1074451 | 7/1967 | United Kingdom | 192/58 B |

*Primary Examiner*—Rodney H. Bonck
*Assistant Examiner*—David D. House
*Attorney, Agent, or Firm*—C. H. Grace; L. J. Kasper

[57] ABSTRACT

A fluid coupling device is disclosed of the type including an output coupling (13) and an input coupling member (11). The speed of operation of the coupling device is determined by the amount of fluid in the operating chamber (37), and fluid communication from the reservoir chamber (41) into the operating chamber is controlled by movement of a valve arm (49) relative to a fill opening (50). The fill opening includes an outer edge (79) which is disposed at an angle relative to a radial line, such that the valving is of the modulating type, i.e., movement of the valve arm in response to increasing temperature results in radially outward movement of the outermost point of the flow area. In accordance with the invention, the valve arm defines an included open area (73) having a leading edge (74) and a trailing edge (75). The flow area is determined by the area of overlap (77,81) of the open area (73) and the fill opening (50). The result is a modulating but limited area which is effective to substantially reduce hysteresis of the coupling device during operation in the decreasing temperature condition, whereby the input horsepower consumed by the device is substantially reduced.

6 Claims, 5 Drawing Figures

FLUID COUPLING WITH HYSTERESIS REDUCING VALVE

BACKGROUND OF THE DISCLOSURE

The present invention relates to fluid coupling devices, and more particularly, to fluid coupling devices of the type including modulating valving.

Although the present invention may be used advantageously in fluid coupling devices having many different configurations and applications, it is especially advantageous in a coupling device of the type used to drive a radiator cooling fan of an internal combustion engine, and will be described in connection therewith.

Viscous shear couplings have been quite popular for many years for driving engine cooling fans, primarily because their use results in a substantial saving of engine horsepower, when compared to a conventional shaft driven fan. The horsepower savings results from the fact that the viscous coupling operates in the engaged, full speed condition only when cooling is needed, and operates in a disengaged, relatively lower speed condition when little or no cooling is required.

In an effort to effect even greater savings of engine horsepower, those working in the art developed "modulating valving" for fluid couplings of the type to which the invention relates. See U.S. Pat. No. 3,227,254, assigned to the assignee of the present invention. Briefly stated, modulating valving has the effect of moving the fluid inlet opening radially outward as the temperature increases, to progressively increase the volume of fluid in the operating chamber of the device as the ambient air temperature increases over a predetermined range.

As is well known to those skilled in the art, the relationship between the output speed of a viscous fluid coupling, and its input speed, is determined by the volume of fluid in the operating chamber which, in turn, is determined by the relationship of the fill and discharge rates. Once sufficient fluid has been forced into the operating chamber to yield the maximum output speed, in response to increasing temperature, it would be expected that a decreasing temperature would then cause fan speed to decrease, following the same speed vs. temperature curve as during the increasing temperature condition. However, it has been shown that this does not occur, but instead, a substantial drop in temperature (as much as 20 degrees F. or about 12 degrees C.) must occur before the fan speed begins to decrease. This phenomenon is referred to as "hysteresis", which will be described in greater detail subsequently. As is well known to those skilled in the art, some hysteresis is inevitable because of factors such as internal friction, etc., but excessive hysteresis is undesirable because it represents wasted engine horsepower, driving the fan at a speed higher than necessary to provide adequate cooling, at any given ambient air temperature.

SUMMARY OF THE INVENTION

Accordingly, it is an object of the present invention to provide a fluid coupling device of the type including modulating valving, wherein the hysteresis losses of the device are substantially reduced.

It is another object of the present invention to provide a valving arrangement for a fluid coupling device which is capable of modulating the flow area of the fluid inlet, while at the same time, limiting the flow area and the fill rate.

The above and other objects of the present invention are accomplished by the provision of an improved fluid coupling device of the type including a first rotatable coupling assembly, and enclosure means associated therewith to define a fluid chamber. A valve means is associated with the assembly to separate the fluid chamber into a fluid operating chamber and a fluid reservoir chamber. A second rotatable coupling member is disposed in the operating chamber and is rotatable relative to the first rotatable coupling assembly. The valve means is operable to control the flow of fluid between the reservoir chamber and the operating chamber, and includes control means associated with the valve means to effect operation thereof in reponse to variations in a predetermined condition. The device includes means operable to pump fluid from the operating chamber into the reservoir chamber in response to a difference in speed of rotation of the first assembly and the second member. The valve means includes a plate-like member defining an inlet disposed to permit flow of fluid from the reservoir chamber to the operating chamber. A movable valve member is operably associated with the control means, and with the fluid inlet to control the flow of fluid through the inlet in response to variations in the predetermined condition. The movable valve member comprises a generally flat member disposed to move in a plane generally parallel to the plate-like member.

The improvement in the fluid coupling device comprises the valve member defining an included open area, and the flow area through the valve means is defined by the area of overlap of the fluid inlet and the included open area. The fluid inlet and the included open area are configured such that the radially outermost point of the area of overlap moves radially outward as the valve member moves from a closed position to an open position.

In accordance with a more limited aspect of the present invention, the open area includes a leading edge and a trailing edge, whereby the flow area through the valve means increases as the leading edge passes over the fluid inlet, but is limited as the trailing edge passes over the fluid inlet, thus limiting the fill rate of the coupling device.

DESCRIPTION OF THE PREFERRED EMBODIMENT

Figure 1:
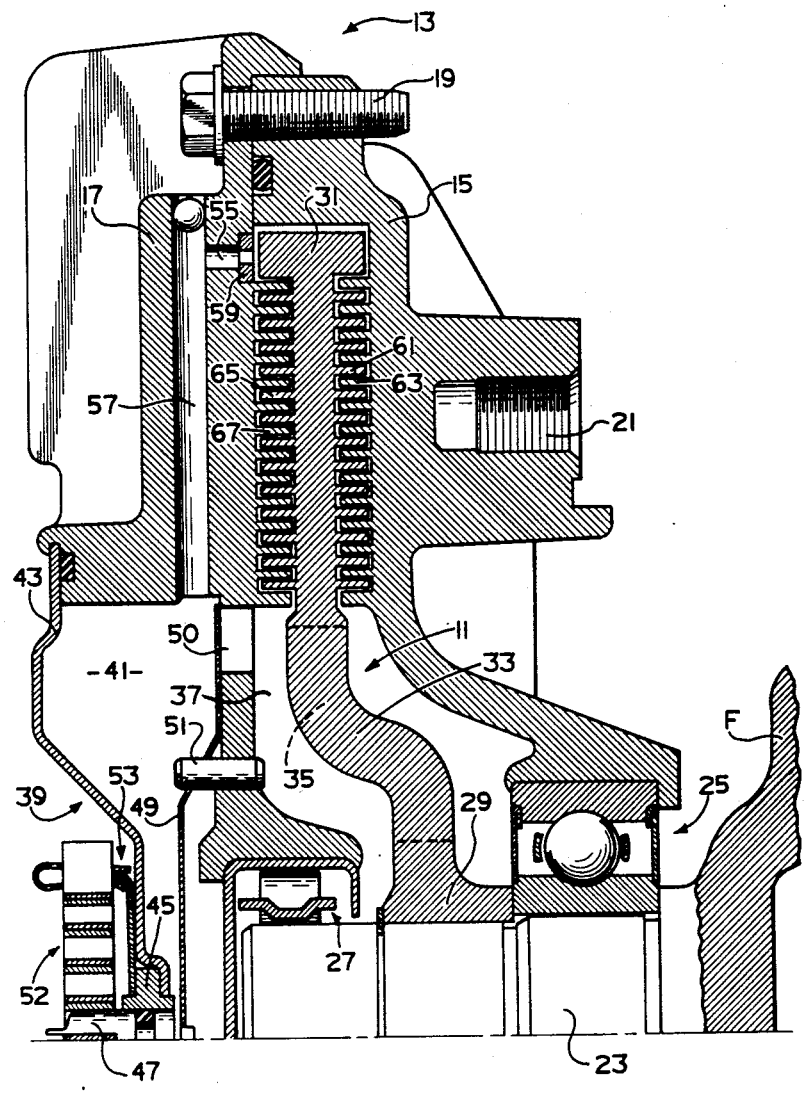
FIG. 1 is an axial cross section illustrating one-half of a typical fluid coupling device of the type which can utilize the present invention.

Referring now to the drawings, which are not intended to limit the invention, FIG. 1 illustrates one preferred form of a fluid coupling device of the type in which the present invention may be utilized. The fluid coupling device includes as input coupling member, generally designated 11, and an output coupling assembly, generally designated 13. The output coupling assembly 13 includes a cast metal housing member 15 and a cast metal cover member 17, the members 15 and 17 being secured together by a plurality of bolts 19. The fluid coupling device of the present invention is adapted to be driven by a liquid cooled engine and, in turn, drives an automotive engine accessory, such as a radiator cooling fan. The fan (not shown) may be bolted to the housing member 15 by means of a plurality of threaded bores 21 formed in the member 15. It will be understood, however, that the use of the present invention is not limited to any particular fluid coupling device configuration or application, except as specifically noted hereinafter.

The fluid coupling device includes an input shaft 23 on which the input coupling member 11 is mounted. The input shaft 23 is rotatably driven, typically by means of a flange F (shown partly in cross section and broken away) which may be bolted to the flange of an engine water pump (not shown). The input shaft 23 functions as a support for the inner race of a bearing set 25, which is seated on the inside diameter of the housing member 15. The forward end (left end in FIG. 1) of the input shaft 23 serves as the inner race for a roller bearing set, generally designated 27, which is seated on the inside diameter of the cover member 17.

The input coupling member 11 is generally annular and includes a hub portion 29 and an annular, disc-like portion 31. Extending radially between the hub portion 29 and disc-like portion 31 is a web portion 33. Web portion 33 defines an opening 35, the function of which is to permit fluid flow radially on both sides of portion 31. The hub portion 29 is pressed onto an intermediate portion of the input shaft 23, such that rotation of the input shaft 23 causes rotation of the input coupling member 11.

The housing member 15 and the cover member 17 cooperate to define a fluid operating chamber 37, within which the input coupling member 11 is rotatably disposed. The cover member 17 cooperates with a cover assembly, generally designated 39, to define a fluid reservoir chamber 41 therebetween.

The cover assembly 39 includes a stamped cover member 43 defining a central aperture which receives a generally cylindrical insert member 45. Rotatably disposed within the insert member 45, and supported thereby, is a valve shaft 47, extending outwardly (to the left in FIG. 1) through the cover member 43. Attached to the inner end (right end in FIG. 1) of the valve shaft 47 is a valve arm 49, the general construction of which forms no part of the present invention, but may be better understood by reference to U.S. Pat. No. 3,055,473. Movement of the valve arm 49 controls the flow of fluid from the reservoir chamber 41 to the operating chamber 37, through a fill opening 50, formed in the cover member 17. Movement of the valve arm 49 is limited by a pin 51 pressed into a bore in the cover member 17.

The cover assembly 39 further includes a bimetal element, generally designated 52 which, in the subject embodiment, is formed in the shape of a helical coil. The inner end of the coil 52 is received in a slot formed in the outer end of the valve shaft 47, while the outer end of the coil 52 is supported by a clip assembly 53, which forms no part of the present invention, but may be made in accordance with U.S. Pat. No. 4,054,193. The clip assembly maintains the outer end of the coil 51 fixed relative to the cover member 43. The manner in which the bimetal coil 52 operates to control the movement of the valve arm 49 is well known in the art, is not an essential feature of the present invention, and therefore, will not be described further.

The cover member 17 defines an axial passage 55 in communication with the operating chamber 37, and a radial passage 57 which provides fluid communication from the axial passage 55 to the reservoir chamber 41. Disposed adjacent the axial passage 55 is a pumping element (wiper) 59, operable to engage the relatively rotating fluid in the operating chamber 37, to generate a localized region of relatively higher fluid pressure, and continually pump a small quantity of fluid back into the reservoir chamber 41, through the passages 55 and 57, as is well known in the art.

In the subject embodiment, the rearward surface of the disc-like portion 31 of the input coupling member 11 forms a plurality of annular lands 61 which define a plurality of annular grooves therebetween. The adjacent surface of the housing member 15 forms a plurality of annular lands 63 which define a plurality of annular grooves therebetween. The lands 61 and 63 are interdigitated to define a serpentine-shaped rearward shear space therebetween. Similarly, the forward surface of the disc-like portion 31 forms a plurality of annular lands 65 which define a plurality of annular grooves therebetween. The adjacent surface of the cover member 17 forms a plurality of annular lands 67, which define annular grooves therebetween. The lands 65 and 67 are interdigitated to define a serpentine-shaped forward shear space therebetween. Although the present invention may be utilized in a fluid coupling device having various shear space configurations, it is especially advantageous in a device having a forward and rearward shear space, and more specifically, in such a device in which both shear spaces are defined by interdigitated lands and grooves, and accordingly, the invention will be described in connection therewith.

Referring still primarily to FIG. 1, a brief description will be given of the fluid flow path during filling of the conventional form of fluid coupling device of the type shown in FIG. 1. When the valve arm 49 moves to begin uncovering the fill opening 50, fluid flows from the reservoir chamber 41 into the operating chamber 37. Of the fluid entering the operating chamber 37, the major portion remains forward of the web portion 33, with a small portion passing through the openings 35 into the region of the chamber 37 rearward of the web portion 33.

Figure 2:
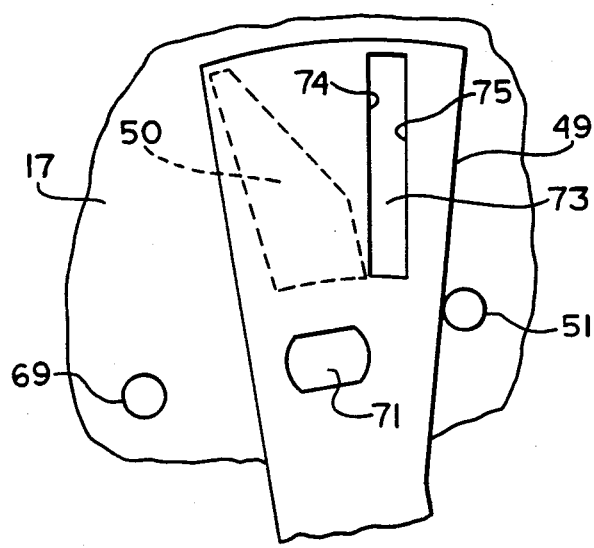
FIGS. 2–4 are fragmentary, plan views, looking to the right in FIG. 1, and on approximately the same scale as FIG. 1, illustrating various operating positions of the valve arm relative to the fill opening.
Figure 3:
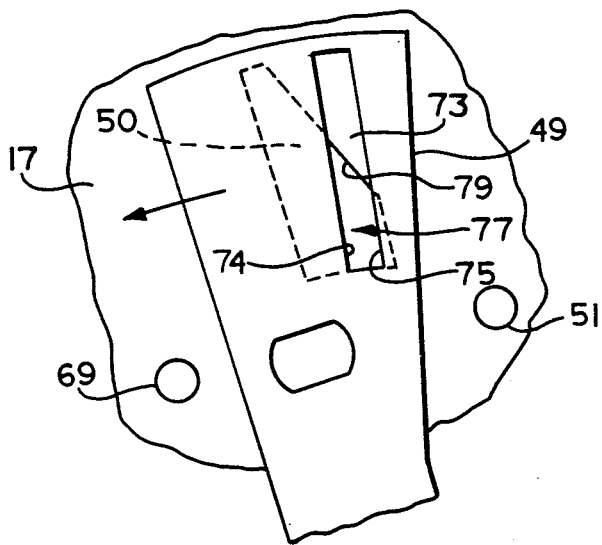
Figure 4:
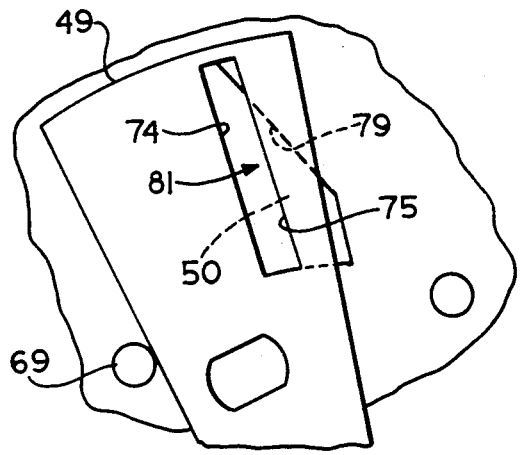

Referring now to FIGS. 2-4, the structure and operation of the present invention will be described in some detail. FIGS. 2-4 are views looking to the right in FIG. 1, and illustrating various operative positions of the value arm 49, relative to the fluid inlet or fill opening 50. The range of movement of the valve arm 49 is defined, to the right, by the pin 51, and to the left, by a similar pin 69 (not shown in FIG. 1).

Referring now primarily to FIG. 2, it may be seen that the valve arm 49 includes an aperture 71, the use of which is generally well known in the art to provide the valve arm 49 with a much greater degree of flexibility than if the valve arm were solid. The aperture 71 forms no part of the present invention and will not be described or referenced subsequently.

The valve arm 49 further defines an included open area 73, having a leading edge 74 and a trailing edge 75. The edges 74 and 75 are referred to as "leading" and "trailing", respectively, because the direction of movement of the valve arm 49, in response to increasing temperature, is in the counterclockwise direction, as viewed in FIGS. 2-4.

Referring still primarily to FIG. 2, when the ambient air temperature near the coil 52 is below a predetermined minimum temperature (e.g., 135 degrees F., or 51 degrees C.), the valve arm 49 is in its closed position. In the closed position of the valve arm 49, the open area 73 does not overlap the fill opening 50, and fluid communication from the reservoir chamber 41 through the fill opening 50, and into the operating chamber 37, is completely blocked by the valve arm 49.

Referring now to FIG. 3, the temperature of the air near the coil 52 has increased sufficiently to cause rotation of the valve arm to a position in which the open area 73 now overlaps the fill opening 50. The area of overlap, generally designated 77 in FIG. 3, is defined by the leading edge 74, the trailing edge 75, and an outer edge 79 of the fill opening 50. As may be seen by viewing FIG. 3, as the open area 73 moves across the fill opening 50, the intersection of the leading edge 74 and outer edge 79 moves progressively outward in a radial direction. Thus, the valving arrangement illustrated in FIGS. 2–4 may be classified as "modulating valving", of the type generally illustrated and described in U.S. Pat. No. 3,227,254, assigned to the assignee of the present invention, and incorporated herein by reference.

As is generally well known to those skilled in the art, the term "modulating valving" refers to a valving arrangement in which variations in a condition such as temperature, and the resulting movement of the valve arm, cause radial movement of the radially outermost portion of the fluid inlet. This radial movement of the outermost portion of the fluid inlet causes more of the fluid in the reservoir chamber 41 to flow axially through the fluid inlet into the operating chamber 37.

Referring now to FIG. 4, the valve arm 49 has reached its fully open position, and further clockwise movement of the valve arm is prevented by the pin 69. This additional movement of the valve arm 49 has moved the open area 73, relative to the fill opening 50, resulting in new, larger area of overlap 81. Thus, it will be understood by those skilled in the art that the area of overlap 81, corresponding to a higher temperature than the area of overlap 77, will permit a greater "fill rate", i.e., rate of flow of fluid from the reservoir chamber 41 to the operating chamber 37.

As was noted in the background of the specification, the output speed of the coupling device (relative to the input speed) is determined by the total volume of fluid in the shear space which, in turn, is determined partly by the area of the fluid inlet. Therefore, in accordance with one of the objects of the invention, the valve arrangement of the present invention is able to provide a fluid inlet (area of overlap) which is modulating, but which, at the same time, is limited by the position of the trailing edge 75. As may best be seen in FIG. 4, the area of overlap 81 is substantially less than the total area of the fill opening 50. The significance of limiting the flow area of the fluid inlet will be explained in greater detail in connection with the description of FIG. 5.

Figure 5:
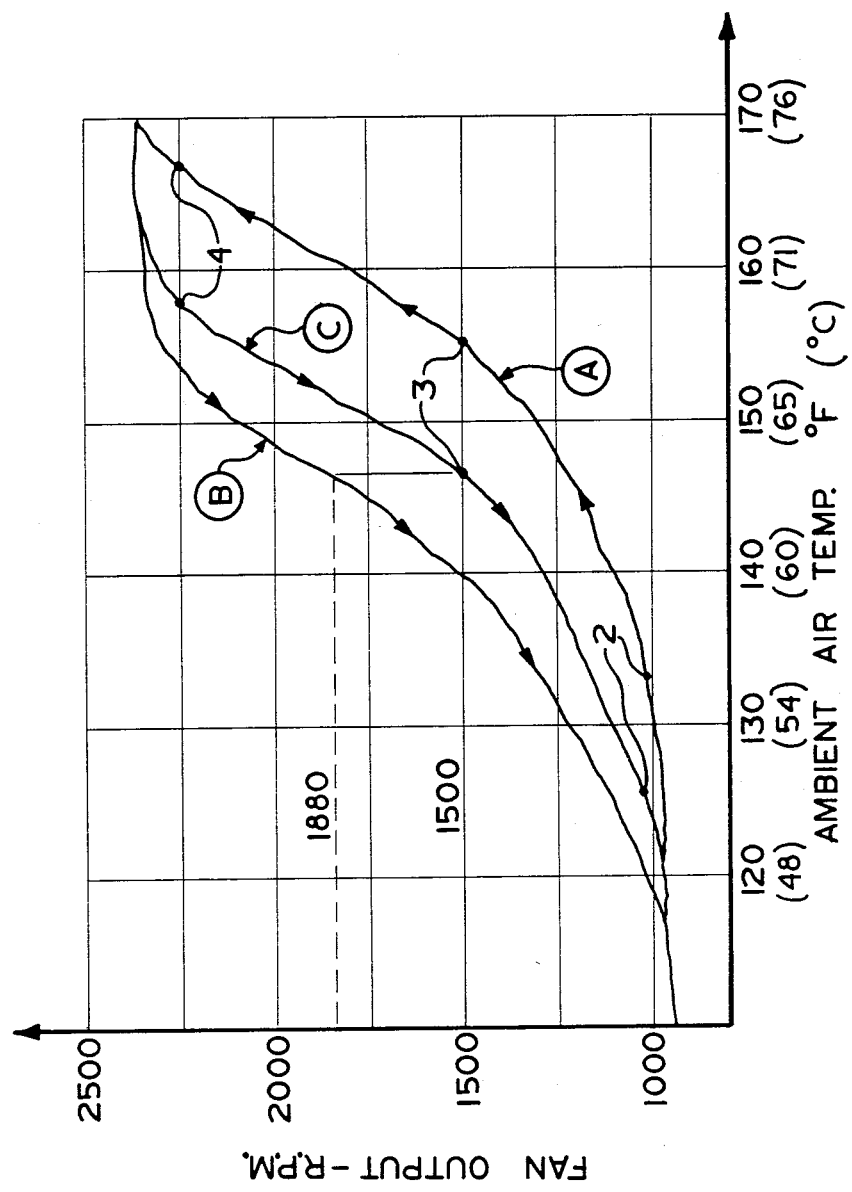
FIG. 5 is a graph of fan output speed vs. ambient air temperature, comparing the present invention (curve C) with the prior art (Curve B).

Referring now to FIG. 5, there is shown a graph of fan output, in r.p.m., as a function of ambient air temperature, in degrees Fahrenheit. The graph of FIG. 5 includes three different curves, labeled A, B, and C. Curve A represents output speed vs. air temperature, as the temperature rises and the coupling device progresses from a disengaged condition (about 120 degrees F. or about 48 degrees C.) to an engaged condition (about 170 degrees or about 76 degrees C.). Curve A is representative of the increasing air temperature condition, either with or without the present invention.

Curve B represents output speed as a function of air temperature, as the temperature decreases, and the coupling progresses from its engaged condition, back to its disengaged condition, without the present invention. As was explained briefly in the background of the specification, it is because of the effects of hysteresis that curve B does not approximately coincide with curve A. Hysteresis is caused by such factors as frictional losses between the valve arm 49 and the adjacent surface of the cover 17 on which the valve arm slides. By comparing curve B with curve A, it may be seen that, for any given air temperature, the output speed is always much higher for the decreasing temperature condition (curve B) than for the increasing temperature condition (curve A). Because the coupling device is designed such that its increasing temperature performance (curve A) suits the cooling needs of the engine, it may be seen that the higher fan speed in the decreasing temperature condition (curve B) represents fan speed in excess of that which is necessary to cool the engine. This excess fan speed is undesirable because it is a waste of engine horsepower, as will be described in greater detail subsequently.

Curve C represents output speed vs. air temperature in the decreasing temperature condition, but using the present invention, as illustrated in FIGS. 2–4. As is seen in FIG. 5, curve C is substantially closer to curve A, and therefore, at any given temperature condition, represents less wasted input horsepower to the fan.

As an aid in understanding the present invention, curves A and C each have a series of points labeled "2", "3", and "4". These points on curves A and C correspond to the positions of the valve arm shown in FIGS. 2, 3, and 4, respectively. In other words, for any position of the valve arm 49, the output speed of the coupling device will be the same in the decreasing temperature condition as in the increasing temperature condition. This is so because, for any given position of the valve arm 49, the fill and discharge rates are the same in the decreasing temperature condition as in the increasing temperature condition.

As an example of the effect of the invention, it should be noted that, with increasing temperature, the valve arm 49 reaches the position shown in FIG. 3 at 155 degrees F. or 68 degrees C. The valve arm position shown in FIG. 3 results in an output speed of 1500 rpm. However, in the decreasing temperature condition, the valve arm position of FIG. 3, and the resulting 1500 rpm output speed, does not occur until the temperature has dropped to about 146 degrees F. or about 63 degrees C., using the present invention (curve C). Without the present invention (curve B) the output speed would not be reduced to 1500 rpm until the air temperature dropped to about 140 degrees F. or about 60 degrees C.

In order to quantify the horsepower savings resulting from the use of the present invention, a vertical line has been drawn from point 3 on curve C to curve B. Drawing this line shows that, at 146 degrees F., 63 degrees C., 63 degrees C., using the invention, fan speed has dropped 1500 rpm, as noted previously. However, without the use of the present invention, the fan speed at 146 degrees F. is reduced only to 1880 rpm. As is well known to those skilled in the art, the engine horsepower required to drive the coupling is proportional to the square of the fan speed. Therefore, the input horsepower at 146 degrees F., 63 degrees C., without the invention is proportional to $(1880)^2$, whereas the input horsepower at 146 degrees F., 63 degrees C., with the invention is proportional to $(1500)^2$. By squaring each of these speeds and comparing, it may be seen that, at 146 degrees F., 63 degrees C., the coupling device without the invention consumes 57 percent more input horsepower than the coupling device utilizing the present invention.

Thus, it may be seen that the present invention provides a modulating valve arrangement for a fluid coupling device in which the valve arm is able to undergo relatively large changes in its radial position, while at the same time limiting the flow area of the fluid inlet, to reduce the undesirable effects of hysteresis of the coupling device. The invention has been described in detail sufficient to enable one of ordinary skill in the art to make and use the same. It is believed that certain modifications and alterations of the preferred embodiment will occur to others upon a reading and understanding of the specification, and it is intended to include all such alterations and modifications as part of the invention, insofar as they come within the scope of the appended claims.

I claim:

1. In a fluid coupling device of the type including a first rotatable coupling assembly, enclosure means associated with said first rotatable coupling assembly to define a fluid chamber therebetween, valve means associated with said first rotatable coupling assembly and disposed to separate said fluid chamber into a fluid operating chamber and a fluid reservoir chamber, a second rotatable coupling member disposed in said fluid operating chamber and being rotatable relative to said first rotatable coupling assembly, said first and second rotatable couplings cooperating to define a viscous shear space therebetween, said valve means being operable to control the flow of fluid between said reservoir chamber and said operating chamber, and including control means associated with said valve means to effect the operation thereof in response to variations in a predetermined condition, means operable to pump fluid from said operating chamber into said reservoir chamber in response to a difference in speed of rotation of said first coupling assembly and said second coupling member, said valve means including a plate-like member defining a fluid inlet disposed to permit flow of fluid from said reservoir chamber into said operating chamber, said fluid inlet being disposed radially inwardly of said viscous shear space, and a movable valve member operably associated with said control means, and with said fluid inlet to control the flow of fluid through said fluid inlet in response to variations in said predetermined condition, said movable valve member comprising a generally flat member disposed to move in a plane generally parallel to said plate-like member, characterized by:

said valve member defining an included open area, the flow area through said valve means being defined by the area of overlap of said fluid inlet and said included open area, said fluid inlet and said included open area being configured such that the radially outermost point of said area of overlap moves radially outward as said valve member moves from a closed position to an open position, wherein said fluid inlet and said included open area are configured such that said flow area is substantially less than the area of said fluid inlet when said valve member is in said open position, to substantially reduce hysteresis as said valve member moves from said open position toward said closed position, one of said fluid inlet and said included open area including an outermost edge which is oriented at an acute angle relative to a radially-extending line.

2. In a fluid coupling device of the type including a first rotatable coupling assembly, enclosure means associated with said first rotatable coupling assembly to define a fluid chamber therebetween, valve means associated with said first rotatable coupling assembly and disposed to separate said fluid chamber into a fluid operating chamber and a fluid reservoir chamber, a second rotatable coupling member disposed in said fluid operating chamber and being rotatable relative to said first rotatable coupling assembly, said first and second rotatable couplings cooperating to define a viscous shear space therebetween, said valve means being operable to control the flow of fluid between said reservoir chamber and said operating chamber, and including control means associated with said valve means to effect the operation thereof in response to variations in a predetermined condition, means operable to pump fluid from said operating chamber into said reservoir chamber in response to a difference in speed of rotation of said first coupling assembly and said second coupling member, said valve means including a plate-like member defining a fluid inlet disposed to permit flow of fluid from said reservoir chamber into said operating chamber, said fluid inlet being disposed radially inwardly of said viscous shear space, and a movable valve member operably associated with said control means, and with said fluid inlet to control the flow of fluid through said fluid inlet in response to variations in said predetermined condition, said movable valve member comprising a generally flat member disposed to move in a plane generally parallel to said plate-like member, characterized by:

said valve member defining an included open area which cooperates with said fluid inlet to control flow through said valve means as said valve member moves from a closed position to an open position, said open area including a leading edge and a trailing edge whereby the flow area through said valve means increases as said leading edge passes over said fluid inlet and is limited as said trailing edge passes over said fluid inlet, the radially outward position of said flow area increasing as said valve member moves from said closed position to said open position, wherein said fluid inlet and said included open area are configured such that said flow area is substantially less than the area of said fluid inlet when said valve member is in said open position, to substantially reduce hysteresis as said valve member moves from said open position toward said closed position, one of said fluid inlet and said included open area including an outermost edge which is oriented at an acute angle relative to a radially-extending line.

3. The improvement as claimed in claim 1 or 2 wherein said device defines an axis of rotation and said movable valve member is disposed to pivot about said axis of rotation.

4. The improvement as claimed in claim 3 wherein said included open area comprises an elongated, generally radially-extending area having substantially less width in the circumferential direction than said fluid inlet.

5. The improvement as claimed in claim 2 wherein said leading and trailing edges are generally parallel and generally radially-extending.

6. The improvement as claimed in claim 2 wherein the flow area continues to increase as said trailing edge passes over said fluid inlet, but at a rate which is less than the rate of increase when only said leading edge is passing over said fluid inlet.

* * * * *